M. K. DUNHAM.
BLOWPIPE.
APPLICATION FILED DEC. 31, 1909.
1,039,036.
Patented Sept. 17, 1912.
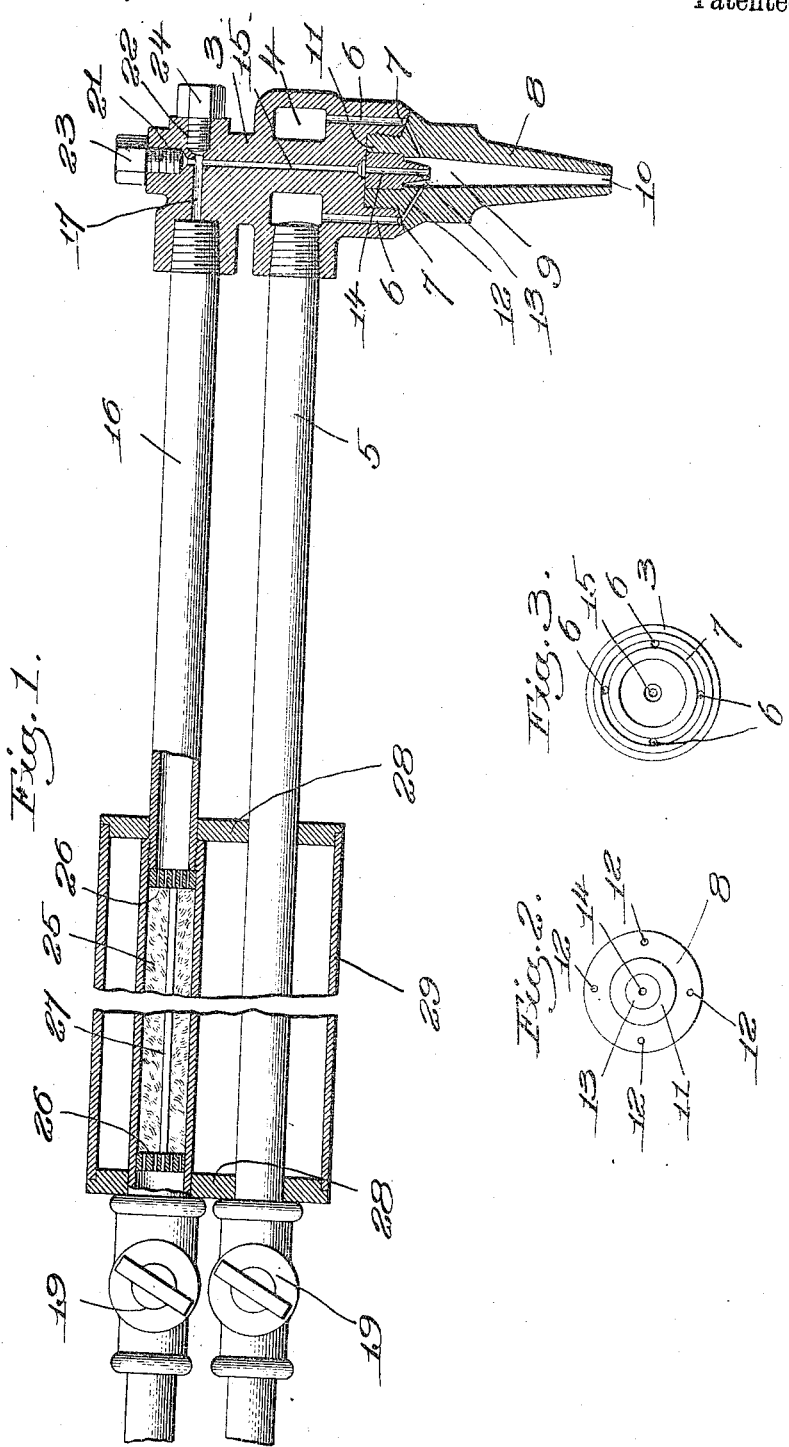

UNITED STATES PATENT OFFICE.

MELBOURNE K. DUNHAM, OF BROOKLINE, MASSACHUSETTS.

BLOWPIPE.

1,039,036.

Specification of Letters Patent.   Patented Sept. 17, 1912.

Application filed December 31, 1909.   Serial No. 535,734.

*To all whom it may concern:*

Be it known that I, MELBOURNE K. DUNHAM, a citizen of the United States, residing at Brookline, county of Norfolk, and State of Massachusetts, have invented an Improvement in Blowpipes, of which the following description, in connection with the accompanying drawing, is a specification, like characters on the drawing representing like parts.

This invention relates to blow pipes and especially to blow pipes designed for autogenous welding.

The object of the invention is to provide a blow pipe of this character so constructed as to eliminate all danger of a blow back and also to provide a blow pipe so arranged that the head and handle will be kept cool while the device is in operation.

The features wherein the invention resides will be hereinafter described and then pointed out in the appended claims.

Referring now to the drawings wherein I have shown one embodiment of my invention, Figure 1 is a sectional view of a device embodying the invention; Fig. 2 is a top plan view of the nozzle detached; Fig. 3 is a bottom plan view of the head with the nozzle detached.

The blow pipe herein illustrated is designed for generating an oxy-acetylene flame, although it is capable of use in generating an oxy-hydrogen or any other similar flame commonly used for autogenous welding.

My improved blow pipe comprises a head 3 provided with an annular chamber 4 into which oxygen is delivered from an oxygen supply pipe 5. This chamber has extending therefrom one or more ducts 6 which lead down through the head and terminate in the lower end thereof in an annular groove 7 which forms a communication between these ducts. Secured to the lower end of the head is a removable nozzle 8 which contains a mixing chamber 9 in which the two gases are mixed, said mixing chamber terminating at the lower end of the nozzle in a discharge port 10 through which the mixed gases are discharged and at which the flame is generated. This nozzle is shown as having a screw-threaded extension 11 which screws into a screw-threaded recess formed in the lower end of the head 3. The nozzle is provided with one or more ports 12 which lead into the mixing chamber 9 and which are so arranged that when the nozzle is in position they communicate with the groove 7. The nozzle 8 is also provided with an auxiliary nozzle or nipple 13 which extends into the mixing chamber 9 to a point slightly below the discharge end of the ports 12, this nipple or nozzle being provided with a central port 14 which communicates with a port 15 formed in the head. Said port 15 has communication with a supply pipe 16 through which the acetylene, hydrogen or other similar gas is delivered to the blow pipe. When the blow pipe is in operation, the gases delivered from the ducts 14 and 12 are mixed together in the mixing chamber and the gas mixture is burned as it is discharged from the port 10 in usual way.

In order to avoid all danger of a blow back, I have eliminated entirely any enlarged chamber in the head for receiving the acetylene, hydrogen, or other similar gas, and I connect the port or duct 15 with the pipe 16 through a small duct 17. With this construction it will be seen that the head contains at no time any larger volume of acetylene, hydrogen, or similar gas, than is confined in the ducts 15 and 17, and as these ducts are comparatively small, it will be impossible for the gas to become ignited in them, or for the flame to flash back through them to the body of gas in the pipe 16. Each of the pipes 5 and 16 is preferably provided with pet-cocks 19 by which the supply of gas can be controlled.

I propose to supply both of the gases to the blow pipe under pressure, rather than to have the acetylene, hydrogen, or similar gas, drawn into the mixing chamber by the discharge of the oxygen, and therefore it is possible for me to deliver the acetylene, hydrogen, etc., through the central port 14 and to deliver the oxygen through the surrounding ports 12. The oxygen is taken from a tank containing oxygen under a considerable pressure and is delivered from the blow pipe at a considerably reduced pressure. There will, therefore, be considerable expansion of the oxygen after it passes the pet-cock 19, and this expansion of the gas in the pipe 5 and the annular passage 4 will have a cooling or refrigerating effect. My blow pipe is designed to make use of this cooling or refrigerating effect for keeping the blow pipe head cool and this end is secured by arranging the oxygen pipe 5 below the pipe 16 and placing the chamber 4 in the lower portion rather than the upper portion of the head 3. I find from practice that there will be sufficient refrigerating effect from the expansion of the oxygen to keep the head cool enough so that it can be used continuously for welding or other purposes without plunging it in the water at frequent intervals, as it is necessary to do with the ordinary blow pipe.

The object of my invention is to make the nozzle 8 removable so that nozzles of different sizes and shapes may be used according to the character of the work being done.

The head is provided with clean-out apertures 21, 22 through which the ducts 15 and 17 can be cleaned, and these apertures are normally closed by plugs 23 and 24. I propose to provide a filter for the acetylene gas, and this is conveniently located in the pipe 16. As shown, said pipe has therein a body of filtering material 25, such as asbestos-wool which is confined between two perforated disks 26 that are shown as connected by a rod 27.

In order to provide a convenient handle by which the blow pipe may be manipulated, I have secured on the two pipes 5 and 16 two disks 28 which are connected by a shell 29 that forms a hand-piece by which the device may be gripped.

I have shown herein one embodiment only of my invention.

Having fully described my invention, what I claim as new and desire to secure by Letters Patent is:—

1. In a blow pipe, the combination with a body having a duct extending centrally therethrough, of a nozzle removably secured to said body and provided with a burner opening and a mixing chamber leading thereto, said nozzle being formed with a nipple 13 which projects into the rear end of the mixing chamber and is provided with a duct communicating with the duct in the body, said body also having an annular chamber surrounding the duct therethrough, but having no communication therewith, and said nozzle having a plurality of radially-arranged ports leading from said annular chamber into the mixing chamber and opening thereinto in an inwardly and downwardly-inclined direction at a point adjacent the end of the nipple.

2. A blow pipe comprising a head and a nozzle removably secured thereto, said nozzle having a mixing chamber therein which terminates at a burner opening at the end thereof, said head having an oxygen-receiving chamber, and the nozzle having one or more ducts leading from said oxygen-receiving chamber laterally into the mixing chamber, said nozzle also having a nipple extending centrally into the mixing chamber and terminating at a point between said ducts and the end of the head and provided with a duct or passageway which leads into said mixing chamber, a pipe communicating with said duct or passageway, and an oxygen pipe leading into the oxygen-receiving chamber and situated between the burner opening and the first-named pipe.

In testimony whereof I have signed my name to this specification, in the presence of two subscribing witnesses.

MELBOURNE K. DUNHAM.

Witnesses:
  LOUIS C. SMITH,
  THOMAS J. DRUMMOND.